(12) United States Patent
Koechner et al.

(10) Patent No.: US 7,955,634 B2
(45) Date of Patent: Jun. 7, 2011

(54) METHOD AND SYSTEM OF PREVENTING RANCIDITY IN WHOLE GRAIN CORN PRODUCTS

(75) Inventors: Alan J. Koechner, Cedar Rapids, IA (US); Gangadhar Rao Vemuganti, Cedar Rapids, IA (US); Joseph Griebat, Mechanicsville, IA (US)

(73) Assignee: The Quaker Oats Company, Chicago, IL (US)

( * ) Notice: Subject to any disclaimer, the term of this patent is extended or adjusted under 35 U.S.C. 154(b) by 475 days.

(21) Appl. No.: 11/401,071

(22) Filed: Apr. 10, 2006

(65) Prior Publication Data

US 2007/0237882 A1 Oct. 11, 2007

(51) Int. Cl.
*A21D 2/00* (2006.01)
(52) U.S. Cl. ........ 426/622; 426/520; 426/463; 426/518; 241/9
(58) Field of Classification Search .......... 426/507, 426/577, 622, 450, 481, 482, 483, 518; 241/7, 241/9; 42/507, 577, 622, 450
See application file for complete search history.

(56) References Cited

U.S. PATENT DOCUMENTS

| | | | | |
|---|---|---|---|---|
| 2,563,798 A * | 8/1951 | Burns et al. | .......... | 426/463 |
| 2,725,300 A * | 11/1955 | Cryns | .......... | 426/622 |
| 3,342,607 A * | 9/1967 | Hickey | .......... | 426/461 |
| 3,399,839 A * | 9/1968 | Anderson et al. | .......... | 241/11 |
| 4,737,371 A * | 4/1988 | Bookwalter | .......... | 426/462 |
| 4,756,920 A * | 7/1988 | Willard | .......... | 426/549 |
| 5,066,506 A * | 11/1991 | Creighton et al. | .......... | 426/450 |
| 5,395,639 A * | 3/1995 | Chawan et al. | .......... | 426/557 |
| 5,614,242 A * | 3/1997 | Fox | .......... | 426/549 |
| 5,939,123 A * | 8/1999 | Welles | .......... | 426/507 |
| 6,025,011 A * | 2/2000 | Wilkinson et al. | .......... | 426/622 |
| 6,409,105 B1 * | 6/2002 | Griebat et al. | .......... | 241/7 |
| 6,410,070 B2 * | 6/2002 | Dahlen et al. | .......... | 426/511 |

OTHER PUBLICATIONS momentarily, NPL, www.thesaurus.com.*

* cited by examiner

*Primary Examiner* — Drew E Becker
*Assistant Examiner* — Preston Smith
(74) *Attorney, Agent, or Firm* — Banner & Witcoff, Ltd.

(57) ABSTRACT

Stabilized whole grain corn products and a method and system of preventing rancidity in whole grain corn products are provided. Whole kernels of corn are fractured into a plurality of pieces and heat treated to inactivate rancidity causing enzymes to produce whole grain corn products of which more than about 40% by weight passes through a size 8 screen. The stabilized whole grain corn products can be milled to produce whole grain grits, meal and flour.

3 Claims, 2 Drawing Sheets

METHOD AND SYSTEM OF PREVENTING RANCIDITY IN WHOLE GRAIN CORN PRODUCTS

TECHNICAL FIELD

The invention relates to whole grain corn products. More particularly, the invention relates to a method and system of preventing rancidity in whole grain corn products.

BACKGROUND OF THE INVENTION

Traditional corn milling involved single step processes which would slowly grind corn to form corn flour or corn grits. However, flours and grits produced by traditional whole grain milling did not have a long shelf life because they would become rancid.

As corn milling technology advanced with the arrival of the industrial revolution, corn kernels were separated into their constituent parts in the initial processing steps and finely or coarsely ground in the latter steps. One of the reasons for this initial separation was to remove the oil-containing germ so that the oil content of the flour and grits could be minimized thereby minimizing rancidity problems.

However, by separating the kernel into its constituent parts before the principal grinding steps, the resulting corn flour and grits are less nutritious than the traditional whole corn flour and grits. In particular, the resulting corn flour and grits are missing the oil, protein, and bran content of traditional whole grain corn products. Research has increasingly shown the importance of bran in the diet. Thus, there is a need for stabilized whole corn products that do not become rancid.

SUMMARY OF THE INVENTION

In accordance with one aspect of the invention, a method of preventing rancidity in whole grain corn products is provided. The method includes fracturing whole grain kernels of corn into a plurality of pieces to create fractured corn. Next, the fractured corn is heat treated at a temperature, moisture and time sufficient to inactivate peroxidase enzymes in the corn that cause rancidity to form an enzyme-deactivated fractured corn. Preferably, the fracturing of the corn is performed so that the resulting fractured pieces are of a size so that heat treatment deactivates the peroxidase enzymes in less than about 30 seconds. Next, the deactivated fractured corn is milled into whole grain corn meal, corn grits or corn flour.

In accordance with another aspect of the invention, a system for preventing rancidity in whole grain corn products is also provided. The system includes a corn fracturing device for fracturing whole grain kernels of corn into a plurality of pieces and a heat treatment device for heat treating fractured corn to inactivate enzymes that cause rancidity in the fractured corn while avoiding gelatinizing significant amounts of starch in the corn. The heat treatment device is associated with the corn fracturing device so that the fractured corn is fed into the heat treatment device.

In accordance with another aspect of the invention, a stabilized fractured corn is provided. The stabilized fractured corn includes stabilized fractured corn germ, stabilized fractured corn endosperm, stabilized fractured corn tip cap and stabilized fractured corn hull. The stabilized fractured corn contains essentially no active peroxidase enzymes. More than 40 weight % of the fractured corn passes through a size 8 screen.

The stabilized fractured corn produced by the method or system of the invention may be further processed to produce whole grain corn meal, grits or flour. The resulting corn products and stabilized fractured corn are shelf-stable because the enzymes in the corn that cause rancidity have been inactivated. They also retain the nutrition and bran of the original corn kernel. The fracturing of the corn before heat treatment allows the heat treating to occur at a rate which is much faster than if whole kernels are stabilized, while avoiding the treatment of very small particles such as flours, for example.

DETAILED DESCRIPTION OF THE INVENTION

Figure 1:
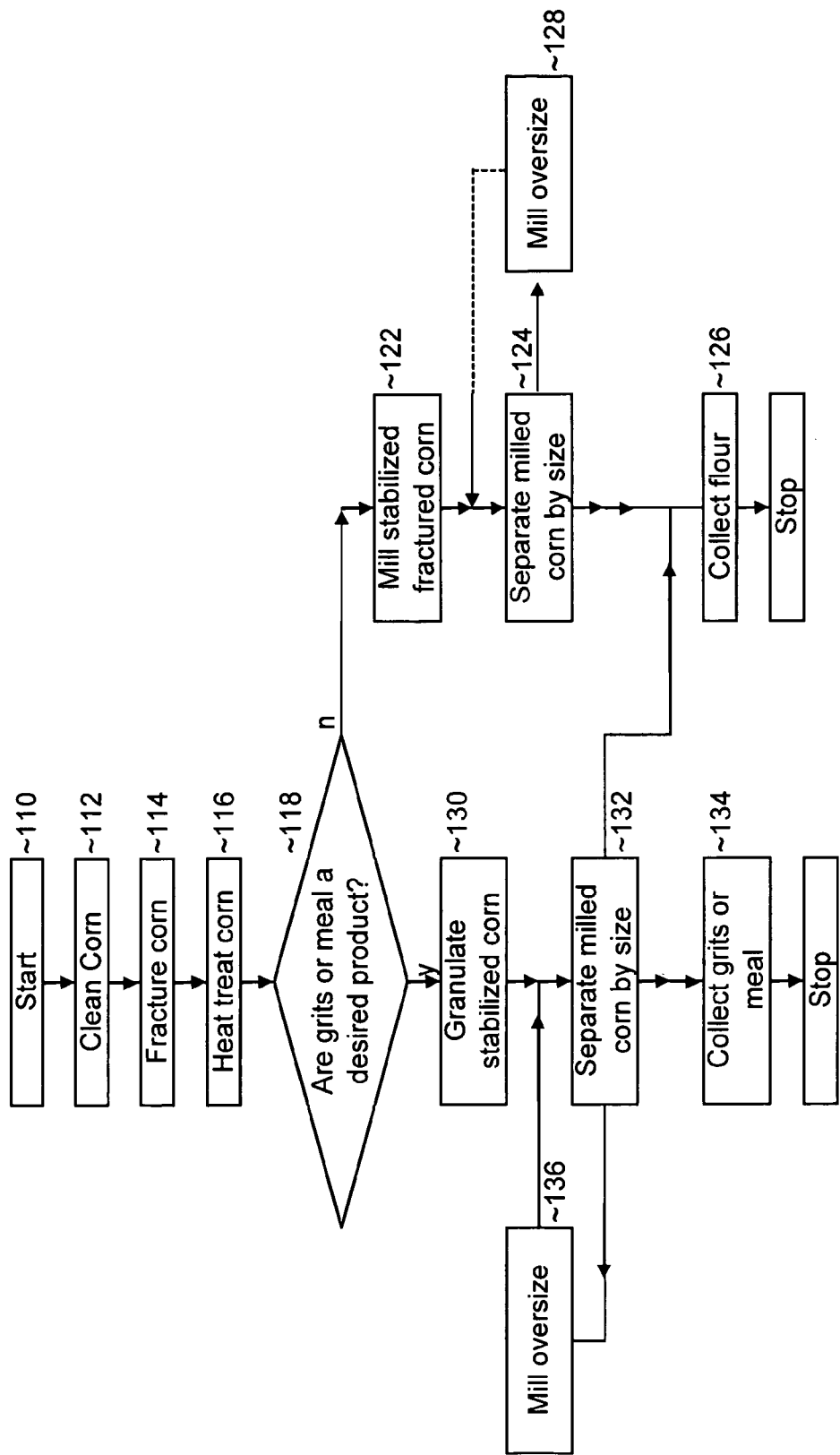
FIG. 1 is a flow chart of the process for preventing rancidity in whole grain corn products.

In accordance with the invention, a method and system for preventing rancidity in whole grain products is provided.

A method for preventing rancidity in whole grain corn products will be described with reference to FIG. 1. Generally whole kernels of corn are cleaned by any suitable process as represented as cleaning step 112 in FIG. 1. Suitable equipment for cleaning corn includes screeners, destoners, and gravity tables. The whole kernels of corn may also be tempered before or after cleaning step 112. However, tempering is generally not preferred and not necessary.

After any cleaning and/or tempering, the whole kernels of corn are fractured into a plurality of pieces to create fractured corn in fracturing step 114. The fractured corn includes grit and endosperm. Suitable equipment for the fracturing step include roller mills, stone grinders, degerminators and impact mills such as entoleters, hammer mills and pulverizers. Cutting is not preferred. The equipment will have an inlet for receiving the whole kernels of corn and an outlet for discharging fractured corn. Preferably, the fractured corn will be sufficiently fractured so that more than 40 weight %, 50 weight %, 60 weight %, 70 weight %, 80 weight %, 90 weight % of the fractured corn passes through a size 8 screen. Preferably, the fractured corn will be sufficiently fractured so that a size 5 screen retains no more than about 20 weight % of the fractured corn, more preferably less than about 12 weight %, and most preferably less than 5 weight %. Preferably no more than about 20 weight % of the fractured corn passes through a size 58 screen. Preferably, the fractured corn has a bulk density less than about 39 lbs/cubic foot, more preferably less than about 38 lbs/cubic foot and still more preferably less than 37 lbs/cubic foot. The preferred densities and size classification of the fractured corn allows the inactivation of peroxidase and other rancidity causing enzymes to occur successfully and rapidly as will be described.

It is not necessary during fracturing, to seal out ambient air. Thus, the fracturing generally occurs in an atmosphere whose composition is substantially similar to the ambient atmosphere. During fracturing the temperature of the grain generally stays at ambient.

Next, the fractured corn is heat treated at a temperature, moisture and time sufficient to inactivate peroxidase enzymes in the corn that cause rancidity in heat treating step 116. Preferably, the fractured corn is maintained at a temperature in the range of from about 190° F. to about 210° F. for at most about 30 seconds, more preferably less than about 20 seconds, still more preferably less than about 12 seconds, and most preferably less than about 9 seconds. Heat treatments below 190° F. are believed to be ineffective. Heat treatments between about 190° F. to about 200° F. have been shown to be effective. Generally, the fractured corn does not have added lime or other alkalis that are used in nixtamalization.

Suitable equipment for heat treatment includes steam conditioners and preconditioners, which are commonly used in the manufacturing of ready-to-eat cereals for pretreating flours before extrusion. Other equipment that allows for intimate contacting between a heating media and the fractured corn may be used. Preferably, the heat treating equipment operates in continuous mode, allows direct contacting between the heating media and the fractured corn, has an inlet for feeding fractured corn and has an outlet for discharging heat treated corn.

Steam is the preferred media for providing the heat and moisture necessary to inactivate the peroxidase enzyme. The steam can be wet, saturated, or superheated. The heat treatment can occur at subatmospheric, atmospheric, and superatmospheric pressures.

After heat treatment step 116, a stabilized fractured corn results. The stabilized fractured corn can be further processed to produce stabilized, whole grain meal, grits and corn. For producing whole grain corn flour, generally the stabilized fractured corn would be milled in milling step 122. Suitable equipment for milling includes roller mills and hammer mills. Active cooling of the stabilized fractured corn before or during milling is not believed to be necessary in part because the initial fracturing step 114 reduces the need degree of milling necessary after heat treatment step 116. If a hammer mill is used for milling in milling step 122, the temperature of the enzyme-deactivated corn when introduced into a hammer mill may be in excess of about 110° F., in excess of about 125° F., or even in excess of about 150° F. without degrading the quality of the whole grain corn flour.

After milling, the milled corn is separated by size in separation step 124 into a flour fraction and an oversize fraction. Suitable devices for separation include a sifter. The oversize fraction is milled in milling step 128. Optionally, the milled oversize can be separated by size in separation step 124. The flour fraction generated in separation step 124 is collected in collection step 126 and can be stored. Milling steps 122 and 128 can be performed by the same mill. Milling and separation steps 122, 124, and 128 can be performed by a single mill that has screens to keep oversize material in the mill while allowing stabilized whole grain corn flour to pass through.

In an embodiment not depicted in FIG. 1, the stabilized fractured corn from heat treatment step 118 can be separated by size into a flour fraction and an oversize fraction. Then the oversize fraction is milled and subjected to additional separations and milling as necessary.

For making grits and meal, the fractured corn is granulated with a roller mill or hammer mill, for example, in granulating step 130. The granulated product is separated into an oversize fraction, a flour fraction, and grits and/or meal fraction(s) in step 132. Suitable devices for separation include a sifter. The screen size in the sifter is dependent on the product to be produced like grits and meal. The oversize fraction can be recycled back to step 130 (not shown) or is granulated in step 136. The grits and/or meal fraction(s) are collected in step 134. The flour faction can be collected in step 126. Granulating includes milling. Granulating indicates that the milling for grits and meal is meant to be coarser than the milling for flour because flour is finer than meal and meal is finer than grits.

It is not necessary during milling and granulating to seal out ambient air. Thus, the milling and granulating generally occurs in an atmosphere whose composition is substantially similar to the ambient atmosphere.

Generally the process is conducted at low pressures, i.e., less than 14.7 psig. Preferably the processes are operated at substantially atmospheric pressure, i.e., approximately less than 2 psig.

Figure 2:
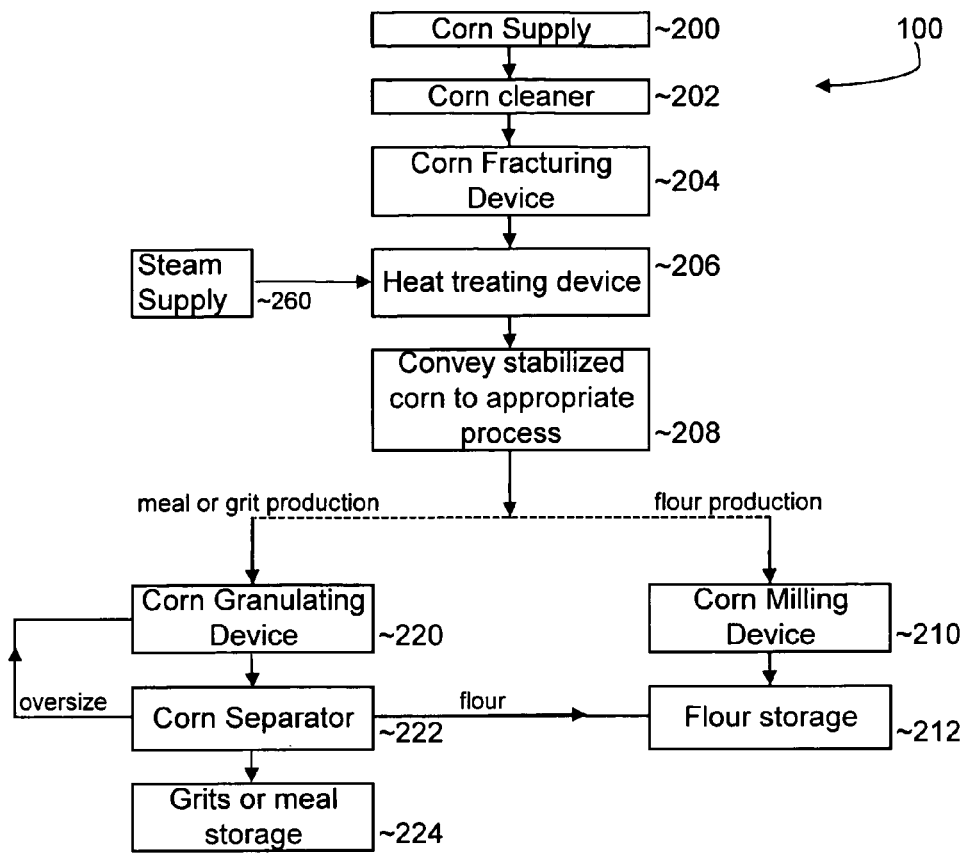
FIG. 2 is a block diagram of the system for preventing rancidity in whole grain corn products.

A system 100 for preventing rancidity in whole grain corn products will be described with reference to FIG. 2.

System 100 is composed of a corn cleaner 202, a corn fracturing device 204, a heat treating device 206, and optionally mill 210.

Any suitable corn cleaner known in the art can be used for corn cleaner 202 in accordance with the invention. Suitable corn cleaners include Screeners, Destoners, Gravity Tables and are available from:

Forsbergs:
Forsbergs, Inc., P.O. Box 510, 1210 Pennington Avenue, Thief River Falls, Minn. 56701 (U.S.A.)
Corn cleaner 202 serves to clean corn.

Any suitable corn fracturing device known in the art can be used for corn fracturing device 204 in accordance with the invention. Suitable corn cleaners include roller mills, stone grinders, degerminators and impact mills such as entoleters, hammer mills and pulverizers, which are available from:

Ocrim:
Ocrim/Cetec Sales/technical office: 407 Headquarters Drive, Suite 6 Millersville, Md. 21108-2549 /USA
Buhler:
Buhler, 13105 $12^{th}$ Avenue North, Plymouth, Minn. 55441-4409
Bliss:
Bliss Industries, Inc. P.O. Box 910 Ponca City, Okla. U.S.A. 74602
Jacobson:
Jacobson Products Carter Day International, Inc. 500 $73^{rd}$ Ave N.E. Minneapolis, Minn. 55432, USA
Entoleter:
Entoleter LLC, 251 Welton Street, Hamden, Conn. 06517

Any suitable heat treatment device capable of maintaining treatment temperatures sufficient to inactivate peroxidase enzymes known in the art can be used for heat treating device 206 in accordance with the invention. Suitable heat treatment devices include steam conditioners and preconditioners, which are sometimes known as paddle mixers, which are available from:

Extru-Tech, Inc.:
Extru-Tech, Inc, 100 Airport Road Sabetha, Kans. 66534
Wenger:
Wenger, 714 Main Street, Sabetha, Kans. 66534-0130 U.S.A.
Buhler:
Other equipment which allows for intimate contacting between a heating media and the fractured corn may be used. Preferably, heat treating device 206 is capable of operating in a continuous mode and allows direct contacting between the heating media and the fractured corn. Preferably, the media is steam provided by a steam supply 260.

Generally, steam conditioners have a stationary shell, and a rotating shaft with paddles or an internal screw for advancing the fractured corn from the inlet towards the outlet and for providing mixing with the heating media. The steam may be introduced co-currently, cross-currently or counter-currently with respect to the flow of fractured corn. Preferably, heat treating device 206 is designed to prevent losses of fractured corn. In particular, heat treating device 206 is preferably closed except at the inlet and outlet, but no airlocks or other features for sealing out ambient air are necessary.

Preferably, heat treating device 206 has an average retention time of 30 seconds or less, more preferably less than about 20 seconds, still more preferably less than about 12 seconds, and most preferably less than about 9 seconds. Retention time can be often controlled by factors such as feed rate, the configuration of paddles, the size of the device. One of skill in the art would know how to control the average retention time.

Heat treating device 206 heat treats the fractured corn at a temperature, moisture and time sufficient to inactivate peroxidase enzymes in the corn that cause rancidity.

Corn cleaner 202 is associated with corn fracturing device 204 so that cleaned corn discharged from the corn cleaner is fed into corn fracturing device 204. Corn fracturing device 204 is associated with heat treating device 206 so that fractured corn discharged from the corn fracturing device 204 is fed into heat treating device 206. Similarly heat treating device 206 is associated with mill 210 so that the enzyme-deactivated corn is fed into mill 210. The association may be implemented by any suitable method known in the art for conveying or transporting food solids from one location to another including belt conveyors, bucket conveyors, chutes and pneumatic transporters.

For producing whole grain corn flour, heat treating device 206 can be associated with mill 210 so that the enzyme-deactivated corn is fed into mill 210. Suitable equipment for mill 210 includes roller mills and hammer mills, which may be obtained from Bliss, Buhler, Entoleter, Jacobson and Ocrim. Hammer mills can be advantageously fitted with screens to keep oversize material in the hammer mill while allowing stabilized whole grain corn flour to pass through.

For producing whole grain corn grits or meal, heat treating device 206 can be associated with granulator 220 so that the enzyme-deactivated corn is fed into granulator 220. Suitable equipment for granulator 220 includes roller mills and hammer mills, which may be obtained from Bliss, Buhler, Entoleter, Jacobson and Ocrim. Hammer mills can be advantageously fitted with screens to keep oversize material in the hammer mill while allowing stabilized whole grain corn flour, grits and meal to pass through. Granulator 220 is associated with corn separator 222 so that the granulated corn is fed into corn separator 222. Corn separator 222 separates the granulated corn into two or more fractions from the group consisting of oversize meal, grits and flour. Any suitable sifter may be used for corn separator 222. Suitable sifters are available from Great Western Manufacturing Co., Inc., 2017 So. 4$^{th}$ Street, P.O. Box 149, Leavenworth, Kans. 66048, Stabilized Fractured Corn Heat treatment 116 or heat treating device 206 produces a stabilized fractured corn. The stabilized fractured corn includes stabilized fractured corn germ, stabilized fractured corn endosperm, stabilized fractured corn tip cap and stabilized fractured corn hull in substantially the same amount as the supply of whole kernels of corn. Typically, the stabilized fractured corn contains about 10 to about 14 wt % stabilized fractured corn germ, about 78.5 to about 85.5 wt % stabilized fractured corn endosperm, about 0.5 to about 1.5 wt % stabilized fractured corn tip cap and about 4 to about 6 wt % stabilized fractured corn hull. More typically, the stabilized fractured corn contains about 12 wt % stabilized fractured corn germ, about 82 wt % stabilized fractured corn endosperm, about 1 wt % stabilized fractured corn tip cap and about 5 wt % stabilized fractured corn hull. The stabilized fractured corn contains essentially no active peroxidase enzymes. Whether or not there are essentially no active peroxidase enzymes can be determined using:

AACC test method 22-80 (American Association of Cereal Chemists)

AOAC test method 963.27 (Association of Official Analytical Chemists)

Other enzymes such as lipase, lipoxigenase can also create rancidity. However, these other enzymes are usually inactivated if the peroxidase enzymes are also inactivated. Generally, the stabilized fractured corn has the same size as the fractured corn. The stabilized fractured corn can be waxy or non-waxy.

The stabilized fractured corn contains essentially no lime or added alkalis.

EXAMPLE 1

Whole kernels of corn were fractured using an Entoleter. The fractured corn has a moisture content of 12.34% by weight and tested positive for peroxidase activity. The fractured corn had the particle size distribution on a total weight basis described in the table below.

| Sieve Analysis | |
|---|---|
| +5: | 1.80% |
| +8: | 27.44% |
| +12: | 22.12% |
| +30: | 24.42% |
| +58: | 9.75% |
| Pan: | 14.47% |

The fractured corn was then fed into a Wenger pre-conditioner. Based on the paddle settings, the Wenger preconditioner had a theoretical processing rate of 44,000 lbs/hr. The product flow was reduced to approximately 15,500 lbs/hr by adjusting the inlet slide gate. The Wenger preconditioner has steam injectors along its length. The steam pressure was adjusted to 50 psig. The steam was dry or saturated. The average retention time was approximately 8 seconds. The Wenger preconditioner was run at 200° F. The product was assumed to be at 200° F. after processing.

Samples of heat treated fractured corn were collected every ten minutes for 30 minutes during a stabilization test from the outlet of the Wenger preconditioner. Every sample was negative for peroxidase activity. Peroxidase activity was tested by Quaker Oats' internal test method. Other test data are summarized in the following table.

| Time (in minutes) | Moisture (weight %) | Protein (weight %) | Fat (weight %) | Ash (weight %) |
|---|---|---|---|---|
| 0 | 15.08 | 6.86 | 2.49 | 1.03 |
| 10 | 14.49 | 6.46 | 2.02 | 0.92 |
| 20 | 14.58 | 6.82 | 2.43 | 1.08 |
| 30 | 14.57 | 6.82 | 2.54 | 1.02 |

EXAMPLE 2

Whole kernels of corn were fractured using an entoleter. The fractured corn had a moisture content of 13.9 to 14.2% and tested positive for peroxidase activity. The fractured corn has a bulk density of 39.8 lbs/cu. ft. The fractured corn had the particle size distribution on a weight basis described in the table below.

| Sieve Analysis | |
| --- | --- |
| +5: | 25.13% |
| +8: | 53.21% |
| +12: | 13.51% |
| +30: | 6.40% |
| +58: | 1.42% |
| Pan: | 0.33% |

The fractured corn was fed into a Wenger pre-conditioner. The fractured corn feed rate was approximately 5,000 lbs/hr. The inlet steam pressure was 20 psig. The average retention time was approximately 10 seconds. The temperature of the heat treated corn at the outlet of the Wenger pre-conditioner varied between 189 and 201° F. Testing of the heat-treated fractured corn indicated that the peroxidase enzymes had been inactivated.

Flour was produced by milling. However, testing of the flour indicated that peroxidase enzymes were still active.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

The invention claimed is:

1. A method of preventing rancidity in whole grain corn products comprising:
    fracturing whole grain kernels of corn into a plurality of pieces to create fractured corn wherein more than about 40 weight % of the fractured corn is retained by a size 8 screen and no more than about 20 weight % of the fractured corn passes through a size 58 screen and wherein the fractured corn comprises endosperm, germ, bran and corn tip;
    feeding the fractured corn into a heat treatment device maintained at a temperature of from about 190° F. to about 200° F. and heat treating the fractured corn in the heat treatment device for at most 30 seconds at a moisture sufficient to inactivate peroxidase enzymes in the corn that cause rancidity to form an enzyme-deactivated fractured corn; and
    milling the enzyme-deactivated fractured corn into a whole grain material selected from the group of corn meal, corn grits, corn flour and combinations thereof.

2. The method of claim 1 wherein the fractured corn has a bulk density less than about 39 lbs/cubic feet.

3. The method of claim 1, wherein milling is performed by a hammer mill producing a corn flour and wherein the temperature of the enzyme-deactivated corn when introduced into the hammer mill is in excess of about 110° F.

* * * * *